United States Patent
Onizuka et al.

(10) Patent No.: US 12,184,447 B2
(45) Date of Patent: Dec. 31, 2024

(54) DATA TRANSMISSION DEVICE AND DATA TRANSMISSION SYSTEM

(71) Applicant: AUDIO-TECHNICA CORPORATION, Tokyo (JP)

(72) Inventors: Kazuhiro Onizuka, Tokyo (JP); Yasuhito Kikuhara, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 950 days.

(21) Appl. No.: 16/621,547

(22) PCT Filed: Mar. 15, 2018

(86) PCT No.: PCT/JP2018/010331
§ 371 (c)(1),
(2) Date: Jul. 21, 2021

(87) PCT Pub. No.: WO2018/230063
PCT Pub. Date: Dec. 20, 2018

(65) Prior Publication Data
US 2021/0351952 A1 Nov. 11, 2021

(30) Foreign Application Priority Data

Jun. 12, 2017 (JP) ................................. 2017-114909

(51) Int. Cl.
*H04L 12/40* (2006.01)
*H04L 12/437* (2006.01)
*H04S 7/00* (2006.01)

(52) U.S. Cl.
CPC ...... *H04L 12/40013* (2013.01); *H04L 12/437* (2013.01); *H04S 7/30* (2013.01); *H04S 2400/15* (2013.01)

(58) Field of Classification Search
None
See application file for complete search history.

(56) References Cited

U.S. PATENT DOCUMENTS

| 2006/0104457 | A1* | 5/2006 | Kawaguchi | H04R 3/005 348/E7.083 |
| 2008/0021703 | A1* | 1/2008 | Kawamura | H04R 3/02 704/226 |
| 2011/0319017 | A1* | 12/2011 | Lee | H04M 1/6091 455/41.1 |

FOREIGN PATENT DOCUMENTS

| CN | 102098467 B | * 12/2012 |
| CN | 103199980 A | * 7/2013 |

(Continued)

*Primary Examiner* — Ario Etienne
*Assistant Examiner* — Mohammad Yousuf A. Mian
(74) *Attorney, Agent, or Firm* — WC&F IP

(57) ABSTRACT

A data transmission device and a data transmission system that can share data generated based on data received from each terminal, and update the shared data in the operation of the system are provided. The data transmission device sends and receives a packet to and from the terminal connected thereto via a communication network and the packet includes a first slot in which individual output data to be output from the terminal is stored and a second slot in which input data to be input to the terminal is stored. The data transmission device includes a sending part that sends the packet to the terminal, a receiving part that receives the packet sent to the terminal, and a controller that generates the input data based on output data including the individual output data stored in the first slot and stores the input data in the second slot.

21 Claims, 6 Drawing Sheets

(56) References Cited

FOREIGN PATENT DOCUMENTS

| | | | |
|---|---|---|---|
| JP | 2005-101803 | * | 4/2005 |
| JP | 2005-101803 | A | 4/2005 |
| JP | 2005-181391 | A | 7/2005 |
| JP | 2006-140930 | A | 6/2006 |
| WO | 2017/033259 | A1 | 3/2017 |

* cited by examiner

DATA TRANSMISSION DEVICE AND DATA TRANSMISSION SYSTEM

TECHNICAL FIELD

The present invention relates to a data transmission device and a data transmission system.

BACKGROUND ART

For example, a data transmission device, such as a control unit (primary unit) used in a conference system, processes (for example, combines) sound signals sent from respective terminals connected to the data transmission device and sends the resulting signal to the terminals (for example, see Japanese Unexamined Patent Application Publication No. 2005-101803). The data transmission device sends and receives signals to and from the terminals in accordance with a transmission method such as a unicast method or a broadband method.

SUMMARY OF INVENTION

Technical Problem

In a case where one system is provided with a plurality of data transmission devices, for example, one data transmission device operates as a primary terminal and the other data transmission devices operate as secondary terminals. The primary terminal controls the operation of the secondary terminals. When a particular function, such as gain control or noise detection, is provided by the whole system, the primary terminal sends data to provide the function to the secondary terminals so that the whole system can share the data. In the invention disclosed in Japanese Unexamined Patent Application Publication No. 2005-101803, however, the primary terminal sends the data that the secondary terminals will output, such as sound data or video data, to the secondary terminals, but does not share the data to provide the particular function in the whole system.

An object of the present invention is to solve the problem described above and to provide a data transmission device and a data transmission system that can share data received from each terminal in the system and can provide a particular function with the whole system based on the received data.

Solution to Problem

A data transmission device according to the present invention is a data transmission device that sends and receives a packet to and from a terminal connected thereto via a communication network, and the packet includes a first slot in which individual output data to be output from the terminal is stored and a second slot in which input data to be input to the terminal is stored. The data transmission device includes a sending part that sends the packet to the terminal, a receiving part that receives the packet sent to the terminal, and a controller that generates the input data based on output data including the individual output data stored in the first slot and stores the input data in the second slot.

Advantageous Effects of Invention

According to the present invention, the data received from each terminal can be shared in the system, and a particular function can be provided with the whole system based on the received data.

DESCRIPTION OF EMBODIMENTS

Figure 1:
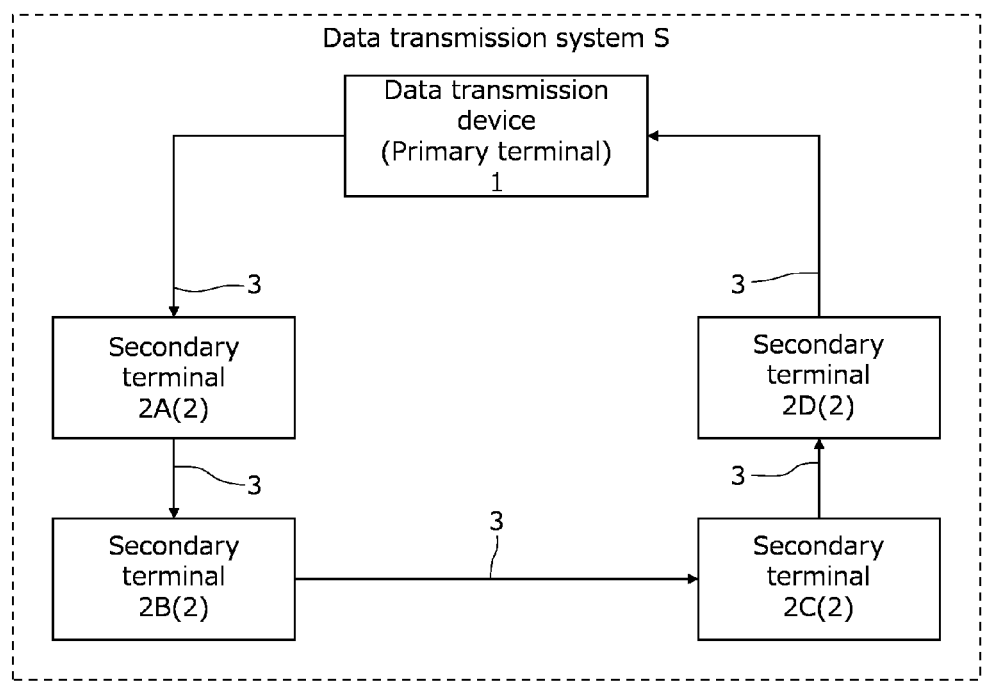
FIG. 1 is a network structure diagram illustrating one embodiment of a data transmission system according to the present invention.

Embodiments of a data transmission device and a data transmission system according to the present invention will now be described with reference to the attached drawings.
Data Transmission System
First, one embodiment of the data transmission system according to the present invention is described.
Structure of Data Transmission System
FIG. 1 is a network structure diagram illustrating an embodiment of the data transmission system according to the present invention (hereinafter referred to as "the present system").

The present system S is, for example, a conference system employed in conferences, classes, or seminars where many participants attend. That is, for example, the present system S controls terminals used by the participants, and adjusts signals including a sound signal.

The present system S includes a terminal 1 set as a primary or a parent machine (hereinafter referred to as "primary terminal"), four terminals 2A, 2B, 2C, and 2D set as secondary or child machines (hereinafter referred to as "secondary terminals"), and a reference microphone (not illustrated). The reference microphone collects an environmental noise in a space of a room where the present system S is installed. Hereinafter, when the secondary terminals 2A to 2D are collectively called without being distinguished, each of the secondary terminals 2A to 2D is referred to as the secondary terminal 2.

It should be noted that the number of secondary terminals is not limited to four, and may be three or less or five or more, for example.

The primary terminal 1 and the secondary terminals 2A to 2D are connected to each other via a communication network 3 such as local area network (LAN) or wide area network (WAN). The primary terminal 1 generates a packet P and sends and receives the packet P to and from the secondary terminal 2 via the communication network 3 (see FIG. 3). The packet P is described below.

The secondary terminals 2A to 2D are connected to the primary terminal 1 by ring connection in which the secondary terminals 2A to 2D are connected in an annular shape. That is, the primary terminal 1 is connected to the secondary terminal 2A, the secondary terminal 2A is connected to the secondary terminal 2B, the secondary terminal 2B is connected to the secondary terminal 2C, the secondary terminal 2C is connected to the secondary terminal 2D, and the secondary terminal 2D is connected to the primary terminal 1. Each of the secondary terminals 2A to 2D can communicate with the primary terminal 1.

It should be noted that each secondary terminal may be connected to the primary terminal by daisy chain connection in which the secondary terminals are linked together in a row.

The primary terminal 1 is one example of the data transmission device according to the present invention (hereinafter referred to as "the present device"). The structure of the present device 1 (primary terminal 1) is described below.

The secondary terminal 2, for example, controls a microphone (not illustrated) connected to the secondary terminal 2, and mixes, distributes, or balances signals (sound signals) from the microphone. The secondary terminal 2 is a terminal that sends and receives data to and from the present device 1. The secondary terminal 2 is, for example, a mixer, a control unit in a conference system, and a discussion unit in a conference system. The microphone connected to the secondary terminal 2 is a sound signal output device that generates the sound signal based on the sound input to the microphone and outputs the sound signal. The sound signal output from the microphone is processed by the secondary terminal 2 based on control information as described below. Examples of the signal processing performed by the secondary terminal 2 include gain control, echo cancel, noise detection, and voice detection.

It should be noted that the present system may include the microphone, or the present device or the secondary terminal may include the microphone.

The secondary terminal 2 includes an input port (not illustrated), an output port (not illustrated), a controller (not illustrated), and a storage (not illustrated).

The input port receives the packet P from the present device 1 or the adjacent secondary terminal 2. The output port sends the packet P to the present device 1 or the adjacent secondary terminal 2. The input port and the output port are provided with, for example, a communication interface (I/F) such as a connector or a terminal and an amplifier.

The controller stores the data in the packet P and retrieves the data from the packet P. The controller is provided with, for example, a processor such as a central processing unit (CPU), a micro processing unit (MPU), or a digital signal processor (DSP), or an integrated circuit such as an application specific integrated circuit (ASIC) or a field programmable gate array (FPGA).

The storage stores the data from the packet P. The storage is provided with, for example, a recording device such as a hard disk drive (HDD) or a solid state drive (SSD) or a semiconductor memory element such as a random access memory (RAM) or a flash memory.

Data Transmission Device

The present device 1 is then described.

Configuration of Present Device

Figure 2:
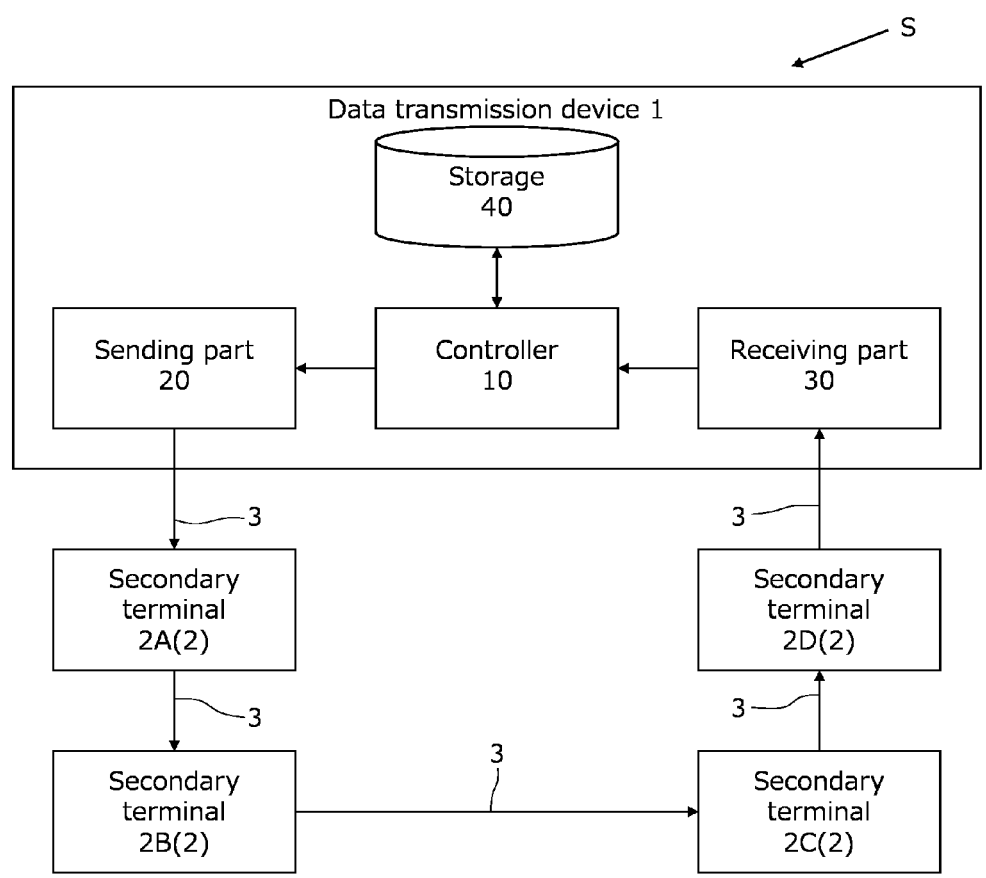
FIG. 2 is a functional block diagram illustrating one embodiment of a data transmission device according to the present invention.

FIG. 2 is a functional block diagram illustrating one embodiment of the present device 1.

FIG. 2 also illustrates the secondary terminals 2 and the communication network 3.

The present device 1 performs processing such as mix, distribute, or balance signals from the secondary terminals 2. The present device 1 is, for example, a mixer or a control unit in a conference system. The present device 1 includes a controller 10, a sending part 20, a receiving part 30, and a storage 40.

The controller 10 generates the packet P that is sent or received by the present device 1, controls the operation of the secondary terminals 2, performs the below-mentioned signal processing, and controls the entire operation of the present device 1. The controller 10 is provided with, for example, a processor such as a CPU, an MPU, or a DSP, or an integrated circuit such as an ASIC or an FPGA. The operation of the controller 10 is described below.

Figure 3:
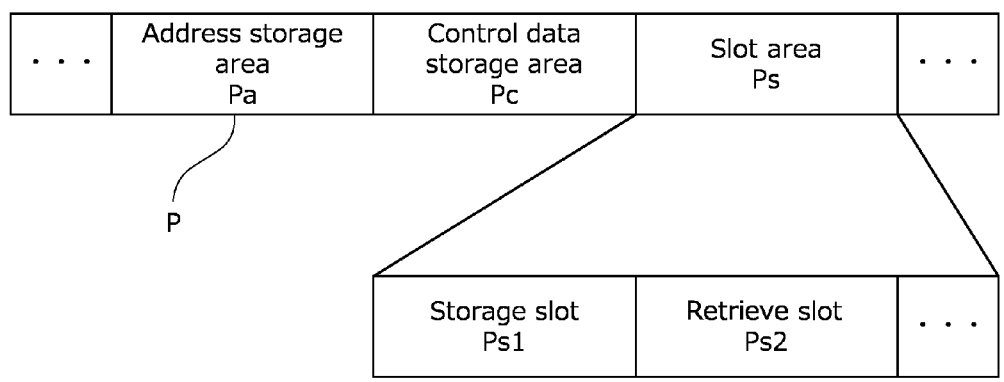
FIG. 3 is a schematic diagram illustrating a data structure of a packet sent and received by the data transmission device in FIG. 2.

FIG. 3 is a schematic view illustrating a data structure of the packet P that is sent or received by the present device 1.

FIG. 3 indicates that the packet P includes an address storage area Pa, a control data storage area Pc, and a slot area Ps.

The "address storage area Pa" is, for example, an area where the address required for the communication between the present device 1 and the secondary terminal 2 or the communication between the secondary terminals 2 is stored. The address is, for example, a MAC address of a destination (secondary terminal 2) of the packet P or a MAC address of a source (the present device 1) of the packet P.

The "control data storage area Pc" is, for example, an area where notification data including a command executed in the present device 1, a command executed in the secondary terminal 2 connected to the present device 1 is stored. The notification data includes primary notification data that is notified from the present device 1 to the secondary terminal 2, and secondary notification data that is notified from the secondary terminal 2 to the present device 1.

The "primary notification data" is, for example, the data that includes a command for acquiring status data of the secondary terminal 2 or a command for permitting a request for utterance from the secondary terminal 2. The "secondary notification data" is, for example, the data that includes a command for requesting the utterance from the secondary terminal 2 or the status data of the secondary terminal 2. "Status data" is, for example, data indicating the operation status of the secondary terminal 2, such as data indicating on/off of the microphone connected to the secondary terminal 2, setting data indicating the priority set in the secondary terminal 2, or volume data indicating the volume of the speaker connected to the secondary terminal 2.

The "slot area Ps" is an area where the output data including the data (individual output data) output from the present device 1 and/or the secondary terminal 2 or the data (input data) input from the controller 10 of the present device 1 to the secondary terminal 2 is stored. The "individual output data" is, for example, audio data such as a signal of voice or environmental sound collected by the microphone or a reference signal used in echo cancel, noise detection, or voice detection performed by the present device 1 and/or the secondary terminal 2. The environmental sound is, for example, a sound of an air conditioner in the room. The "input data" is the data that the controller 10 generates based on the output data. The input data is described below in detail.

The slot area Ps includes a storage slot Ps1 and a retrieve slot Ps2. The "storage slot Ps1" is an area dedicated for writing, in which the individual output data output from the present device 1 and/or the secondary terminal 2 is stored. The individual output data is stored in the storage slot Ps1 when new individual output data is added to the individual output data that has been stored in the storage slot Ps1. The sum of the added individual output data corresponds to the output data in the present invention. The "retrieve slot Ps2" is an area dedicated for reading the secondary terminal 2, in which the input data to be input to (retrieved into) the secondary terminal 2 is stored. The storage slot Ps1 is a first slot in the present invention, and the retrieve slot Ps2 is a second slot in the present invention.

Referring back to FIG. 2, the sending part 20 sends the packet P generated by the controller 10 to the secondary terminal 2 via the communication network 3. The sending part 20 is provided with, for example, an amplifier and an I/F such as a connector or a terminal. The present device 1 performs communication in accordance with, for example, Institute of Electrical and Electronics Engineers (IEEE) 802.3 between the sending part 20 and the receiving part 30, and the secondary terminal 2.

The receiving part 30 receives, from the secondary terminal 2, the packet P sent from the sending part 20. The receiving part 30 is provided with, for example, an amplifier and an I/F.

The storage 40 stores information required for the present device 1 to perform the below-mentioned information processing. The storage 40 is provided with, for example, a recording device such as an HDD or an SSD, a semiconductor memory element such as a RAM or a flash memory.

Operation of Present System

The operation of the present system S is then described.

Figure 4:
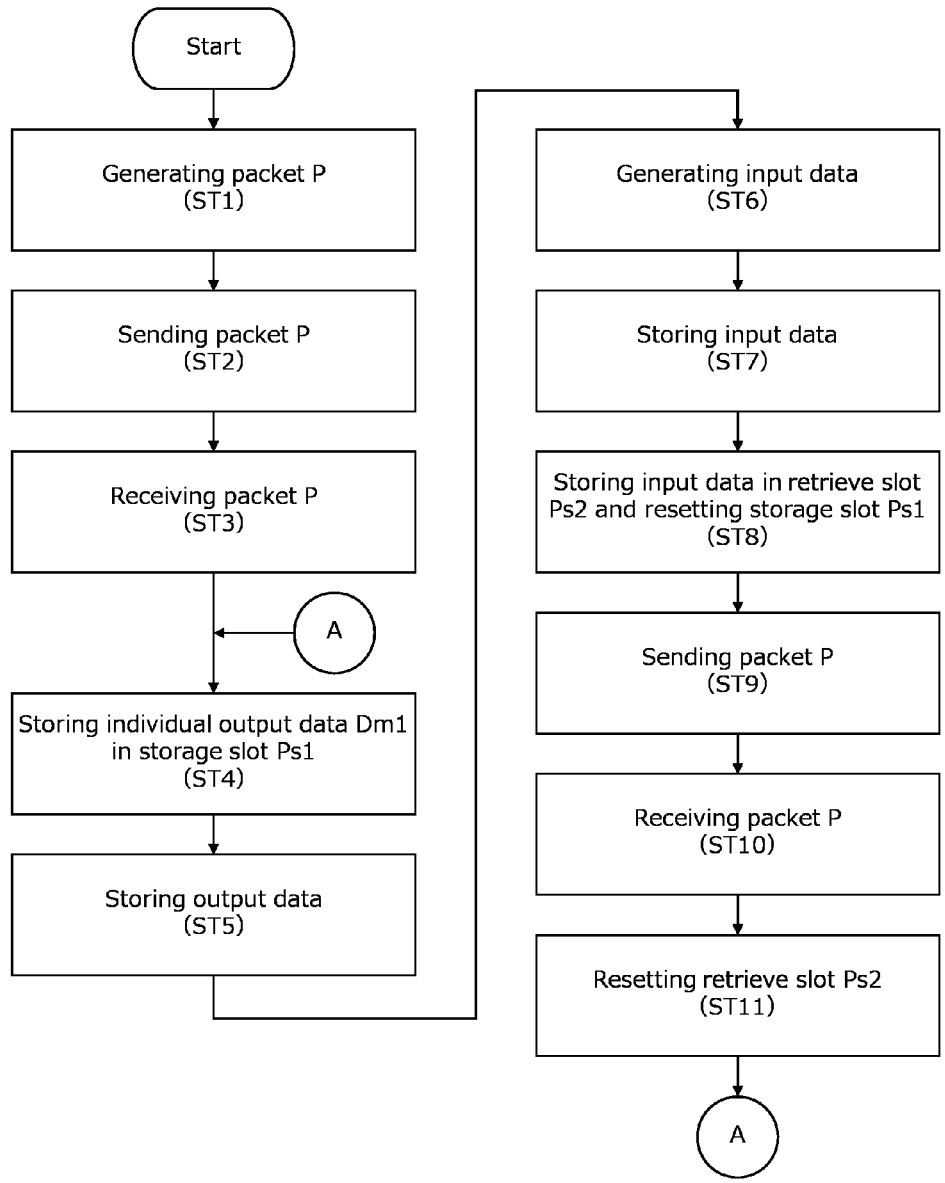
FIG. 4 is a flowchart illustrating information processing of the data transmission device in FIG. 2.

FIG. 4 is a flowchart illustrating the information processing of the present device 1.

Figure 5:
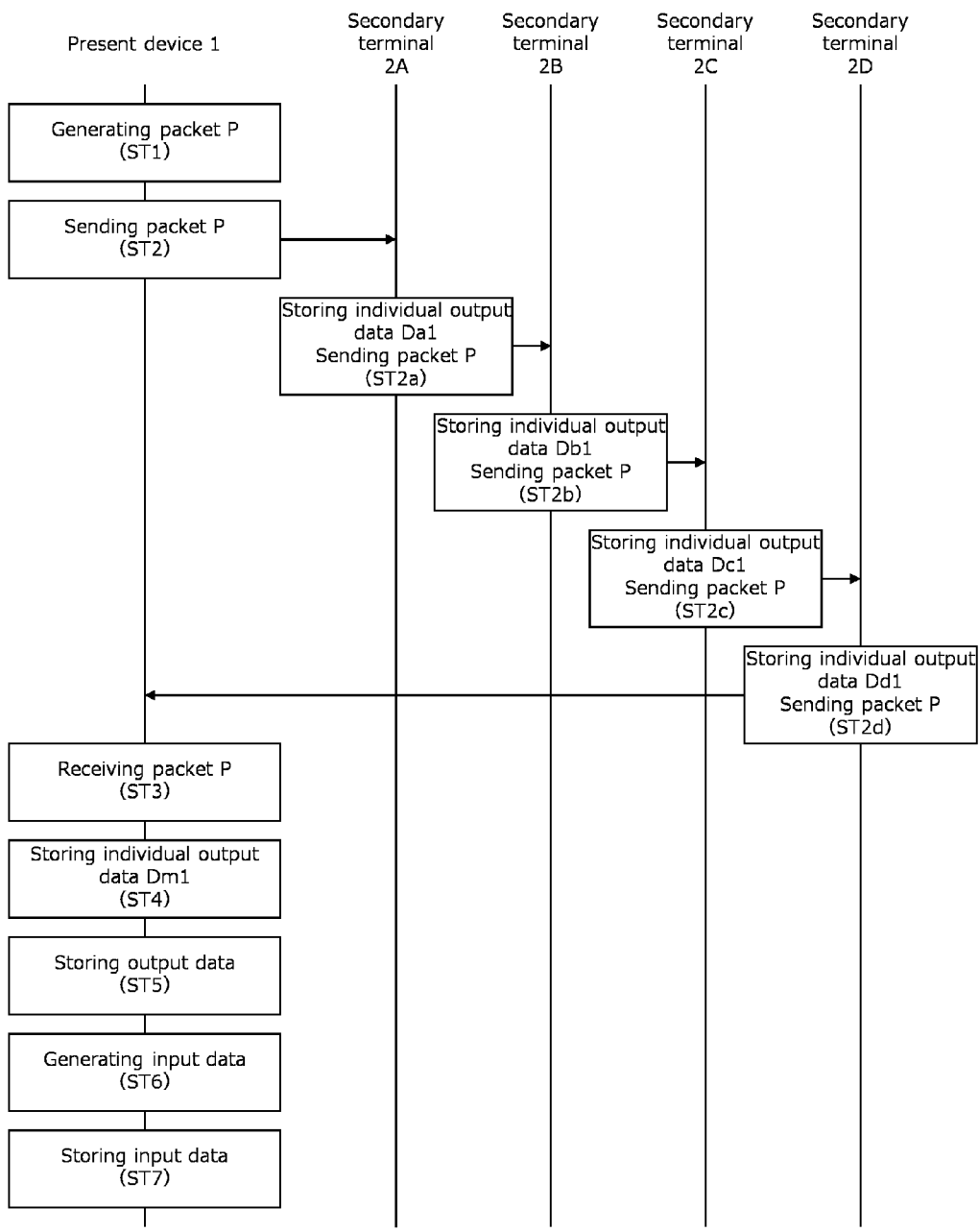
FIG. 5 is a sequence diagram illustrating a part of information processing of the data transmission system in FIG. 1.

FIG. 5 is a sequence diagram illustrating a part of the information processing of the present system S.

FIG. 5 illustrates one example in which the information processing of the present system S includes steps (ST2a, ST2b, ST2c, ST2d) and each secondary terminal 2 stores the data in the storage slot Ps1.

First, the controller 10 generates the packet P whose storage slot Ps1 is empty (ST1). The sending part 20 sends the packet P to the secondary terminal 2A (ST2).

The secondary terminal 2A stores individual output data "Da1" in the storage slot Ps1 (ST2a) and sends the packet P to the secondary terminal 2B.

The secondary terminal 2B stores individual output data "Db1" in the storage slot Ps1 (ST2b) and sends the packet P to the secondary terminal 2C.

The secondary terminal 2C stores individual output data "Dc1" in the storage slot Ps1 (ST2c) and sends the packet P to the secondary terminal 2D. The secondary terminal 2D stores individual output data "Dd1" in the storage slot Ps1 (ST2d) and sends the packet P to the receiving part 30 in the present device 1.

It should be noted that each secondary terminal may compare its own individual output data and the sum (output data) of the individual output data stored in the storage slot and determine whether to store the individual output data in the storage slot. That is, for example, when the signal level of its own individual output data is extremely smaller than the signal level of the output data stored in the storage slot (for example, error level), each secondary terminal may not store the individual output data in the storage slot.

The receiving part 30 then receives the packet P (ST3). The controller 10 stores individual output data "Dm1" in the storage slot Ps1 in the packet P (ST4), and stores the output data (for example, Da1+Db1+Dc1+Dd1+Dm1) stored in the storage slot Ps1 to the storage 40 (ST5). At this stage, any piece of the individual output data included in the output data includes the signal (environmental signal) corresponding to the environmental noise collected by the reference microphone. That is, for example, while the reference microphone is connected to the secondary terminal 2D, the individual output data "Dd1" includes the environmental signal. In this case, the secondary terminal 2D is a particular secondary terminal in the present invention.

The controller 10 generates the input data based on the output data stored in the storage slot Ps1 (ST6). The controller 10 causes the storage part 40 to store the input data (ST7). That is, the input data is input to the present device 1.

Figure 6:
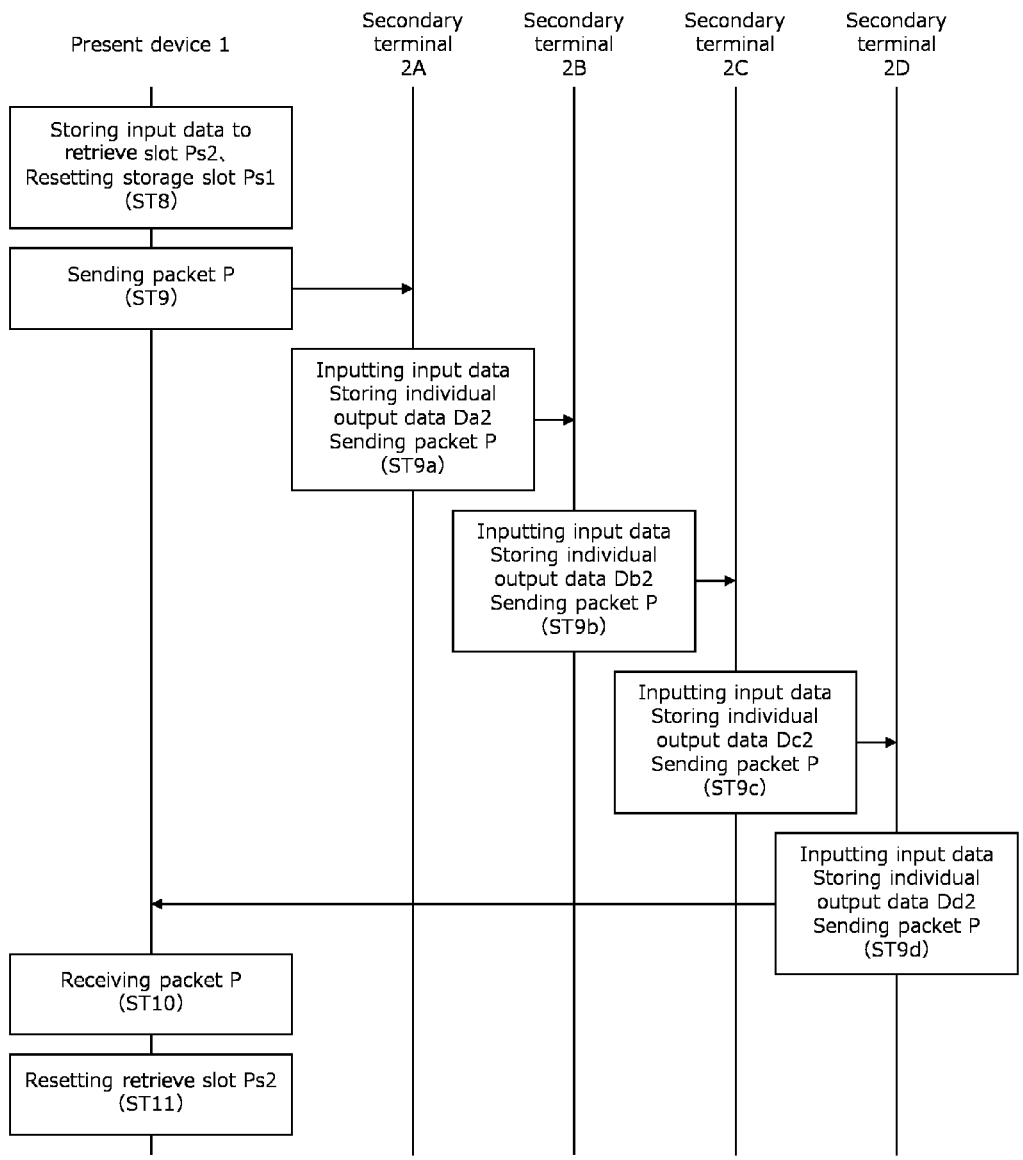
FIG. 6 is a sequence diagram illustrating another part of the information processing of the data transmission system in FIG. 1.

FIG. 6 is a sequence diagram illustrating another part of the information processing of the present system S.

FIG. 6 illustrates one example in which the information processing of the present system S includes steps (ST10a, ST10b, ST10c, ST10d) and each secondary terminal 2 stores the individual output data in the storage slot Ps1.

The controller 10 then stores the input data in the retrieve slot Ps2 and resets the storage slot Ps1, that is, makes the storage slot Ps1 empty (ST8). The sending part 20 sends, to the secondary terminal 2A, the packet P whose storage slot Ps1 is empty and retrieve slot Ps2 stores the input data therein (ST9).

The "resetting the storage slot Ps1" refers to generating the packet P whose storage slot Ps1 is empty by the controller 10. That is, for example, resetting the storage slot Ps1 includes a process of deleting the output data stored in the storage slot Ps1 and a process of newly generating the packet P whose storage slot Ps1 is empty. Thus, the capacity of the packet P transmitted to the secondary terminal 2 is reduced, since the packet P whose storage slot Ps1 is empty is sent to the secondary terminal 2. Therefore, the communication load of the present system S is reduced. Further, unnecessary data does not exist in the storage slot Ps1 and the entry of noise into the data to be sent and received through the packet P can be suppressed.

When receiving the packet P having the input data stored in the retrieve slot Ps2 from the present device 1, the secondary terminal 2A inputs (retrieves) the input data stored in the packet P in the controller of the secondary terminal 2A. The retrieved input data is stored in the storage of the secondary terminal 2A. As a result, for example, setting content that defines the operation of the secondary terminal 2A is changed based on the input data as described below. At this stage, the secondary terminal 2A stores the individual output data "Da2" in the storage slot Ps1 (ST9a). The secondary terminal 2A sends the packet P to the secondary terminal 2B.

When receiving the packet P having the input data stored in the retrieve slot Ps2 from the present device 1, the secondary terminal 2B inputs (retrieves) the input data stored in the packet P in the controller of the secondary terminal 2B. The retrieved input data is stored in the storage of the secondary terminal 2B. As a result, for example, setting content that defines the operation of the secondary terminal 2B is changed based on the input data as described below. At this stage, the secondary terminal 2B stores the individual output data "Db2" in the storage slot Ps1 (ST9b). The secondary terminal 2B sends the packet P to the secondary terminal 2C.

When receiving the packet P having the input data stored in the retrieve slot Ps2 from the present device 1, the secondary terminal 2C inputs (retrieves) the input data stored in the packet P in the controller of the secondary terminal 2C. The retrieved input data is stored in the storage of the secondary terminal 2C. As a result, for example, setting content that defines the operation of the secondary terminal 2C is changed based on the input data as described below. At this stage, the secondary terminal 2C stores the individual output data "Dc2" in the storage slot Ps1 (ST9c). The secondary terminal 2C sends the packet P to the secondary terminal 2D.

When receiving the packet P having the input data stored in the retrieve slot Ps2 from the present device 1, the secondary terminal 2D inputs (retrieves) the input data stored in the packet P in the controller of the secondary terminal 2D. The retrieved input data is stored in the storage of the secondary terminal 2D. As a result, for example, setting content that defines the operation of the secondary terminal 2D is changed based on the input data as described below. At this stage, the secondary terminal 2D stores the individual output data "Dd2" in the storage slot Ps1 (ST9d). The secondary terminal 2D sends the packet P to the receiving part 30 of the present device 1.

The receiving part 30 receives the packet P (ST10) and sends the packet P to the controller 10. The controller 10 resets the retrieve slot Ps2 (ST11), and the information processing of the present system S returns to the process (ST4).

It should be noted that when the present device receives the packet having the input data stored therein from the secondary terminal, the input data may be stored in the storage of the present device. In other words, the input data stored in the retrieve slot may be input to the present device.

Thus, when the secondary terminal 2 receives the packet P having the input data stored in the retrieve slot Ps2, the input data is input to (retrieved into) the secondary terminal 2 that has received the packet P. That is, the secondary terminal 2 retrieves the input data regardless of whether the secondary terminal 2 stores the individual output data in the storage slot Ps1. Therefore, the secondary terminal 2 always shares the input data with the present device 1 that is the primary terminal. As a result, the operation of the secondary terminal 2 is controlled based on the input data generated by the present device 1.

Input Data

The input data generated by the controller 10 is determined based on, for example, types of the individual output data (for example, Da1, Db1, Dc1, Dd1, Dm1), connection modes between the present device 1 and each of the secondary terminals 2 and/or status information of the secondary terminal 2.

For example, when the individual output data is the sound signal from the microphone connected to the present device 1 and the secondary terminal 2, the input data is the sum (Da1+Db1+Dc1+Dd1+Dm1) of the sum of the sound signals (Da1+Db1+Dc1+Dd1) and the sound signal (Dm1) from the microphone connected to the present device 1. That is, the controller 10 generates (updates) the output data (Da1+Db1+Dc1+Dd1+Dm1) by adding its own individual output data (Dm1) to the output data (Da1+Db1+Dc1+Dd1) from the secondary terminals 2A to 2D. The controller 10 then generates the input data (Da1+Db1+Dc1+Dd1+Dm1) based on the output data. In this case, the input data is the sum signal (summing signal) of the sound signals from all the terminals included in the present system S. As a result, for example, the present device 1 and the secondary terminals 2 calculate the gain value of the microphone based on the sum signal. The present device 1 and the secondary terminals 2 perform the signal processing of the sound signal output from the microphone based on the calculated gain value. In this case, the sum signal is one example of the control information in the present invention, which controls the operation of the present device 1 and each of the secondary terminals 2. That is, the present system S provides the gain sharing in real time with the whole present system S through the sending and receiving of the packet P. The microphone connected to the present device 1 is a primary sound signal output device in the present invention, and the microphone connected to the secondary terminal 2 is a secondary sound signal output device in the present invention.

At this stage, the individual output data output from the secondary terminal 2D that is the particular secondary terminal includes the environmental signal as described above. The present device 1 generates the output data based on the individual output data output from the particular secondary terminal (secondary terminal 2D) and generates the input data based on the output data. In other words, the present device 1 generates the input data based on the individual output data (environmental signal) output from the particular secondary terminal. As a result, the present system S provides the accurate signal processing in consideration of the environmental noise.

In addition, the present device 1 and the secondary terminals 2 can share the maximum value of the signal levels of the sound signals from all the microphones based on the sum signal. In this case, the present device 1 and the secondary terminals 2 perform the voice detection using the maximum value of the signal level as a threshold value (for example, a value of maximum value±several decibels). That is, the present system S shares the threshold value required for the voice detection in the whole present system S.

At this stage, for example, when the individual output data is the signal (background noise signal) corresponding to the background noise collected by the microphone connected to the present device 1 and the secondary terminal 2, the input data is the sum of the signal of the background noise signals. In this case, the present device 1 and the secondary terminals 2 perform the noise detection by, for example, using the sum of the signal of the background noise signals as the reference signal.

Thus, the present system S performs predetermined signal processing by sharing the input data in the entire present system S or for each terminal based on types of output data collected by the present device 1 from each secondary terminal 2 and the input data generated based on the output data. That is, the present system S shares the input data in the present system S, and provides a particular function with the whole system S based on the input data.

CONCLUSION

According to the embodiment described above, when the secondary terminal 2 receives the packet P having the input data stored in the retrieve slot Ps2, the input data is input to (retrieved into) the secondary terminal 2 regardless of whether the secondary terminal 2 having received the packet P stores the output data in the storage slot Ps1. Therefore, in the present system S, the secondary terminal 2 can share the input data with the present device 1 that is the primary terminal, and update the input data.

According to the embodiment described above, the storage slot Ps1 is reset when the sending part 20 sends the packet P to the secondary terminal 2. Therefore, the capacity of the packet P sent to or received from the secondary terminal 2 is reduced and the communication load of the present system S is reduced. In addition, the unnecessary data does not exist in the storage slot Ps1 and the entry of noise into the data to be send and received through the packet P can be suppressed.

Further, according to the embodiment described above, in the present system S, in the sending and receiving of the packet P, the secondary terminal 2 stores the output data in the storage slot Ps1, the controller 10 of the primary terminal 1 (the present device 1) generates the input data, and the input data stored in the retrieve slot Ps2 is input to the secondary terminal 2. That is, the present system S can share the input data during the operation of the present system S, and update the shared input data during the operation of the present system S.

In addition, according to the embodiment described above, each secondary terminal 2 stores the output data in the storage slot Ps1. The output data to be stored in the storage slot Ps1 is added to the output data that has already been stored in the storage slot Ps1. That is, each output data is added when the output data passes each secondary terminal 2. Therefore, the process load of the output data in the present device 1 is reduced.

In addition, according to the embodiment described above, in the present system S, the present device 1 generates the input data based on the output data from the secondary terminal 2 and the input data is input to the secondary terminal 2. As a result, another secondary terminal 2 with a function, which the present device 1 and the secondary terminal 2 do not have (for example, echo canceling function or noise detecting function), may be added to the present system S so that the another secondary terminal 2 can share the input data and execute this function. Accordingly, the present system S can extend its function easily.

It should be noted that according to the embodiment described above, the controller 10 of the present device 1 generates the input data based on the output data stored in the storage slot Ps1. Instead of this configuration, the controller of the present device may generate additional data based on the output data stored in the storage slot and may generate the input data based on the output data and the additional data. That is, for example, the controller of the present device acquires, as the output data, the sum of the sound signals collected by the microphone connected to the secondary terminal, and calculates the ratio between the sum and each sound signal as the additional data. The controller of the present device calculates the gain value set to each microphone based on of the output data and the additional data, and sends the gain value as the input data to the secondary terminal. As a result, the present device that is the primary terminal calculates the gain value set to all the microphones and provides the gain sharing in the whole system. In this case, the gain value is one example of the control information in the present invention.

According to the embodiment described above, the input data is generated based on the output data. Alternatively, the input data may be generated based on the output data and the individual input data corresponding to the respective secondary terminals. The "individual input data" is the data used by the secondary terminal corresponding to the individual input data for the signal processing. The individual input data is, for example, a weight coefficient generated based on the signal level of the individual output data or the like. When calculating the gain value, for example, the secondary terminal minutely adjusts the gain value using the individual input data.

Further, the individual input data may include control information that controls operation of the secondary terminal, such as a gain value, for example. In this case, the sound signal output from the microphone connected to the secondary terminal (included in the secondary terminal) is processed based on this gain value.

In another example, if the secondary terminal is disposed at a place different from the present device, the input data may be a signal obtained by combining the sound signals from the secondary terminals (combined signal) and the sound signal from the present device. That is the controller may generate the combined signal from the secondary terminals and the sound signal from the present device as the input data based on the output data. In this case, the combined signal is input to the present device and the sound signal from the present device is input to the secondary terminals. As a result, the present device and the secondary terminals can share the input data (each combined signal) as a reference value of echo canceling (sound signal on remote side). That is, the present system can provide the echo canceling function with the whole present system.

In another example, if only the present device has the echo canceling function, the input data may be a signal in which the echo component is removed from each sound signal.

In another example, if the output data is the sound signal from the microphone connected to the secondary terminal, the input data may be the ratio between the sum of sound signals and each sound signal. In this case, the ratio between the sum of sound signals and each sound signal is one example of the control information that controls the operation of the present device and/or the secondary terminal. The secondary terminal calculates the gain value that is set to the microphone connected to the same secondary terminal based on the input data. That is, the present system provides the gain sharing in the whole present system.

In another example, the present device may generate the individual input data based on the output data and the status data. That is, for example, the present device may generate the individual input data (weight coefficient or the like) that increases the gain value of the microphone whose gate is on and decreases the gain value of the microphone whose gate is off. In still another example, in accordance with priority among the secondary terminals, the present device may generate the individual input data that increases the gain value of the secondary terminal having the priority. As a result, the present device can control the operation of the secondary terminal in accordance with the state of the secondary terminal.

Thus, the present device may generate the individual input data based on the output data and at least one of the primary notification data and the secondary notification data.

The packet may include a plurality of storage slots and a plurality of retrieve slots. In this case, the present system stores different pieces of input data in the respective retrieve slots, and thereby the secondary terminals can share pieces of input data from sending and receiving the packet once. That is, the present system reduces the communication load due to the sending and receiving of packets and causes the secondary terminal to perform a plurality of processes.

REFERENCE SIGNS LIST

S Data transmission system
1 Data transmission device
2 Secondary terminal
3 Communication network
10 Controller
20 Sending part
30 Receiving part
40 Storage
P Packet
Ps1 Storage slot (first slot)
Ps2 Retrieve slot (second slot)

The invention claimed is:

1. A data transmission device for sending and receiving a packet to and from at least one terminal connected thereto via a communication network, the packet including: a first slot in which individual output data, which is a sound signal, to be output from the terminal is stored; and concurrent with the first slot a second slot in which input data to be input to the terminal is stored, the data transmission device comprising:
a primary sound signal output device configured to generate the sound signal based on an input sound and to output the sound signal;
a transmitter configured to send the packet to the terminal;
a receiver configured to receive the packet sent to the terminal; and
a controller configured to generate the input data based on output data including the individual output data stored in the first slot and stores the input data in the second slot, wherein
the sound signal output from the primary sound signal output device is stored in the first slot as the individual output data,
the input data is a sum signal of the sound signal output from the primary sound signal output device and the sound signal output from the terminal and functions as control information for controlling operation of the terminal, and
the terminal performs predetermined signal processing based on the control information.

2. The data transmission device according to claim 1, wherein the controller is further configured to reset the first slot when the transmitter sends the packet to the terminal.

3. The data transmission device according to claim 1, wherein the controller is further configured to generate additional data based on the output data, and to generate the input data based on the output data and the additional data.

4. The data transmission device according to claim 1, wherein
the terminal includes a secondary sound signal output device that generates the sound signal based on the input sound, and outputs the sound signal, and
the sound signal output from the secondary sound signal output device is processed by the terminal based on the control information.

5. The data transmission device according to claim 4, wherein the control information includes a gain value of the secondary sound signal output device.

6. The data transmission device according to claim 1, wherein the control information includes the sound signal output from the primary sound signal output device and the sound signal output from the terminal.

7. The data transmission device according to claim 6, wherein the predetermined signal processing includes at least one of a gain adjusting process, an echo canceling process, a noise detecting process, and a sound detecting process.

8. The data transmission device according to claim 1, wherein the terminal performs the predetermined signal processing based on the control information and the individual output data.

9. A data transmission system comprising:
a primary terminal; and
at least one secondary terminal connected to the primary terminal via a communication network, wherein
the primary terminal is configured to send and to receive a packet to and from the secondary terminal, wherein the packet includes, concurrently:
a first slot in which individual output data, which is a sound signal, to be output from each of the primary terminal and the secondary terminal is stored, and
a second slot in which input data to be input to the primary terminal and the secondary terminal is stored,
the primary terminal is further configured to generate the input data based on output data including the individual output data, and to store the input data in the second slot,
when the secondary terminal receives the packet that has the input data stored in the second slot, the input data is input to the secondary terminal having received the packet, wherein
the input data is a sum signal of the sound signal output from the primary terminal and the sound signal output from the secondary terminal, and functions as control information for controlling operation of each of the primary terminal and the secondary terminal, and
the primary terminal and the secondary terminal perform predetermined signal processing based on the control information.

10. The data transmission system according to claim 9, wherein
the at least one secondary terminal comprises a plurality of secondary terminals,
the primary terminal is connected to the secondary terminals, and
each of the secondary terminals stores the individual output data in the first slot.

11. The data transmission system according to claim 9, wherein
the secondary terminal includes a sound signal output device that generates the sound signal based on an input sound and outputs the sound signal, and
the sound signal output from the sound signal output device is processed by the secondary terminal based on the control information.

12. The data transmission system according to claim 11, wherein the control information includes a ratio between a sum of the sound signals from each of the secondary terminals and the sound signal from each of the secondary terminals.

13. The data transmission system according to claim 9, wherein the primary terminal is further configured to
generate individual input data corresponding to each of the secondary terminals based on the individual output data corresponding to the respective secondary terminals stored in the first slot, and
generate the input data based on the individual input data corresponding to each of the secondary terminals.

14. The data transmission system according to claim 13, wherein the individual input data includes the control information for controlling the operation of the secondary terminal corresponding to the individual input data.

15. The data transmission system according to claim 14, wherein
the secondary terminal includes a sound signal output device that generates the sound signal based on an input sound and output the sound signal, and
the sound signal output from the sound signal output device is processed by the secondary terminal based on the control information.

16. The data transmission system according to claim 15, wherein the control information includes a gain value of the sound signal output device.

17. The data transmission system according to claim 13, further comprising a reference microphone configured to collect an environmental noise, wherein the secondary terminals include a particular secondary terminal to which the reference microphone is connected, the individual output data corresponding to the particular secondary terminal includes an environmental signal corresponding to the environmental noise collected by the reference microphone, and the primary terminal is further configured to generate the input data based on the environmental signal.

18. The data transmission system according to claim 9, wherein the packet includes status data that indicates an operation status of the secondary terminal, and the primary terminal is further configured to generate the input data based on the output data and the status data.

19. The data transmission system according to claim 9, wherein the packet includes at least one of primary notification data notified from the primary terminal to the secondary terminal, and secondary notification data notified from the secondary terminal to the primary terminal; and the primary terminal is further configured to generate the input data based on the output data and at least one of the primary notification data and the secondary notification data.

20. The data transmission system according to claim 9, further comprising a plurality of sound signal output devices configured to generate the sound signal based on an input sound and to output the sound signal, wherein the plurality of sound signal output devices include a primary sound signal output device connected to the primary terminal, and a secondary sound signal output device connected to the secondary terminal, the primary terminal is further configured to calculate a gain value of the primary sound signal output device based on the input data, and to process the sound signal from the primary sound signal output device, and the secondary terminal calculates a gain value of the secondary sound signal output device based on the input data, and processes the sound signal from the secondary sound signal output device.

21. The data transmission system according to claim 9, wherein the primary terminal and the secondary terminal perform the predetermined signal processing based on the control information and the individual output data.

\* \* \* \* \*